US005237619A

United States Patent [19]

[11] Patent Number: 5,237,619

[45] Date of Patent: Aug. 17, 1993

Frassinetti

[54] SOUND MIXER WITH BAND SEPARATION

[76] Inventor: Flaminio Frassinetti, Minerbio (Bologna), Italy

[21] Appl. No.: 728,648

[22] Filed: Jul. 11, 1991

[30] Foreign Application Priority Data

Jul. 13, 1990 [IT] Italy ................................ 3598 A/90

[51] Int. Cl.[5] ................................................ H04B 1/00

[52] U.S. Cl. ....................................... 381/119; 381/81; 381/85; 381/100

[58] Field of Search ............... 381/119, 118, 120, 100, 381/28, 81, 82, 85

[56] References Cited

U.S. PATENT DOCUMENTS

| | | | |
|---|---|---|---|
| 4,357,492 | 11/1982 | Campbell et al. | 381/119 |
| 4,374,300 | 2/1983 | Ponto et al. | 381/119 |
| 4,993,073 | 2/1991 | Sparkes | 381/119 |
| 5,129,006 | 7/1992 | Hill et al. | 381/100 |

*Primary Examiner*—Jin F. Ng
*Assistant Examiner*—Nina Tong
*Attorney, Agent, or Firm*—Darby & Darby

[57] ABSTRACT

In a mixer there is a plurality of preamplifiers followed by a plurality of tone control groups connected to a plurality of voltage followers to which a series of active filters is connected, for selecting frequency bands of signals. Then a plurality of adders is connected to the seried of filters for mixing the signals in each frequency band selected by the filters and for sending the mixed signal to a plurality of line amplifiers and final amplifiers, with which loudspeakers are connected. The preamplifiers, the tone control groups, the voltage followers, the series of filters, the adders, the line and power amplifiers and the loudspeakers are connected so as to form a plurality of circuits, all of them equal to each other.

8 Claims, 2 Drawing Sheets

SOUND MIXER WITH BAND SEPARATION

BACKGROUND OF THE INVENTION

The present invention relates to an apparatus for mixing sound with band separation. In conventional audio mixers, signals coming from the various inputs are mixed in a single line if the equipment is mono, or in two lines if the equipment is stereo.

DESCRIPTION OF THE PRIOR ART

Audio signals are usually mixed, over a wide band, ranging from 20 Hz to 20 KHz. The mixed audio signal is taken from the mixer and is sent to an adder circuit followed by a line amplifier that controls the power amplifiers, which are cascade-connected to the line aplifiers.

The output of the power amplifiers is sent to respective groups of loudspeakers.

Several different types of audio mixers are known, with different features; such features can concern monitor outputs, which can be one or more, up to four, auxiliary inputs, which can be one or two, for special effects like echoes, reverberations.

Other features concern commuters for direct outputs, monitors, etc.

The critical point of these apparatuses is mainly the mixing of input signals since, as it has been said before, this operation is carried out over a on a single line.

For example, let us suppose that it is necessary to amplify sounds coming from a number of musical instruments and/or from singers. In this case, we should have a mixer with a number of input channels at least equal to the number of instruments and/or singers, a line output to control the power end, and possibly a monitor output and an input for echo or reverberation effects.

Each input signal is kept at an adequate volume, so that each signal has a preset volume after mixing.

However the musical instruments are different from one another, both from the point of view of frequency response, and of volume range; considering a bass guitar, for example, the frequency response may fall in a range from 50 Hz to 3000 Hz including harmonics, while the sound dynamic can easily cause the mixer to saturate, and, consequently, the adder, to produce unpleasant harmonic distortions, not only for the relative range but on the whole audio range.

Another typical drawback of this type of apparatus, even though not very marked, is caused by phase displacements, due to controls of high and bass tones.

In fact certain frequencies, particularly the harmonics of the instruments which are indispensable to reproduce the timbre, thus the sound quality as much correspondent to reality as possible, in many cases are weakened, sometimes even deadened, e.g. in the case of two signals in phase opposition put into the adding circuit.

SUMMARY OF THE INVENTION

The band-separation apparatus provided by the present invention is designed in such a way as to find a remedy for all the typical drawbacks at the present state of the art.

More precisely, the present invention provides an apparatus allowing to separate into more frequency bands (e.g. three) a signal delivered by a voltage follower (subsequent to groups, relative to each input, made up of a preamplifier and a tone control), sending it subsequently to a real mixing line for each band selected by the same separating apparatus.

Said operation is carried out by a certain number of active filters for dividing electric signals related to the audio band; e.g.: a low-pass filter to select the frequencies ranging from 20 Hz to 800 Hz; a band-pass filter from 800 Hz to 5000 Hz; a high-pass filter from 5 KHz to 20 KHz.

The mixing of signals belonging to the same band is carried out by an adding circuit, thus the apparatus comprises three mixing lines (low, medium and high frequencies) in mono equipment and six lines in stereo equipment.

The mixing can take place on any number of inputs (e.g. up to 24), corresponding to the same number of instruments, voices, playback heads, etc.

In the output from each mixer is located a line amplifier followed by the power amplifier, then by the loudspeaker suitable for the reproduction of the signal in the specific band previously selected.

The advantages of said apparatus may be summarized as follows: reduction of harmonic distortion, elimination of phase displacements, better volume range of sound reproduction consequent to higher incisiveness, more power, all this being obtained without a marked increase of tones.

Moreover a better definition of timbre of the sounds is obtained while, in case of saturation, this takes place only in the relative band.

The sound mixer with band separation, is provided with at least two input channels, each input channel including a transducer for supplying electric signals corresponding to sounds coming from a relative sound source, a preamplifier connected with each transducer, a tone control group and a voltage follower.

The mixer moreover comprises two equal series of active bandpass filters, each series of filters covering the whole audio spectrum and being connected to the output of a respective follower.

Further there is a series of adders, in a number equal to the number of the filters of each series, with each adder connected to the outputs of the corresponding filters, and a series of line amplifiers.

Each line amplifier is cascade-connected with a relative adder.

Lastly, there is a series of power amplifiers, each of which is connected with a relative line amplifiers, which send the amplified sound to a series of loudspeakers.

DESCRIPTION OF THE DRAWINGS

The invention will be described further, with particular reference to a preferred embodiment of the apparatus illustrated in the drawings attached herewith, wherein.

DESCRIPTION OF THE PREFERRED EMBODIMENT

Figures 1, 3:
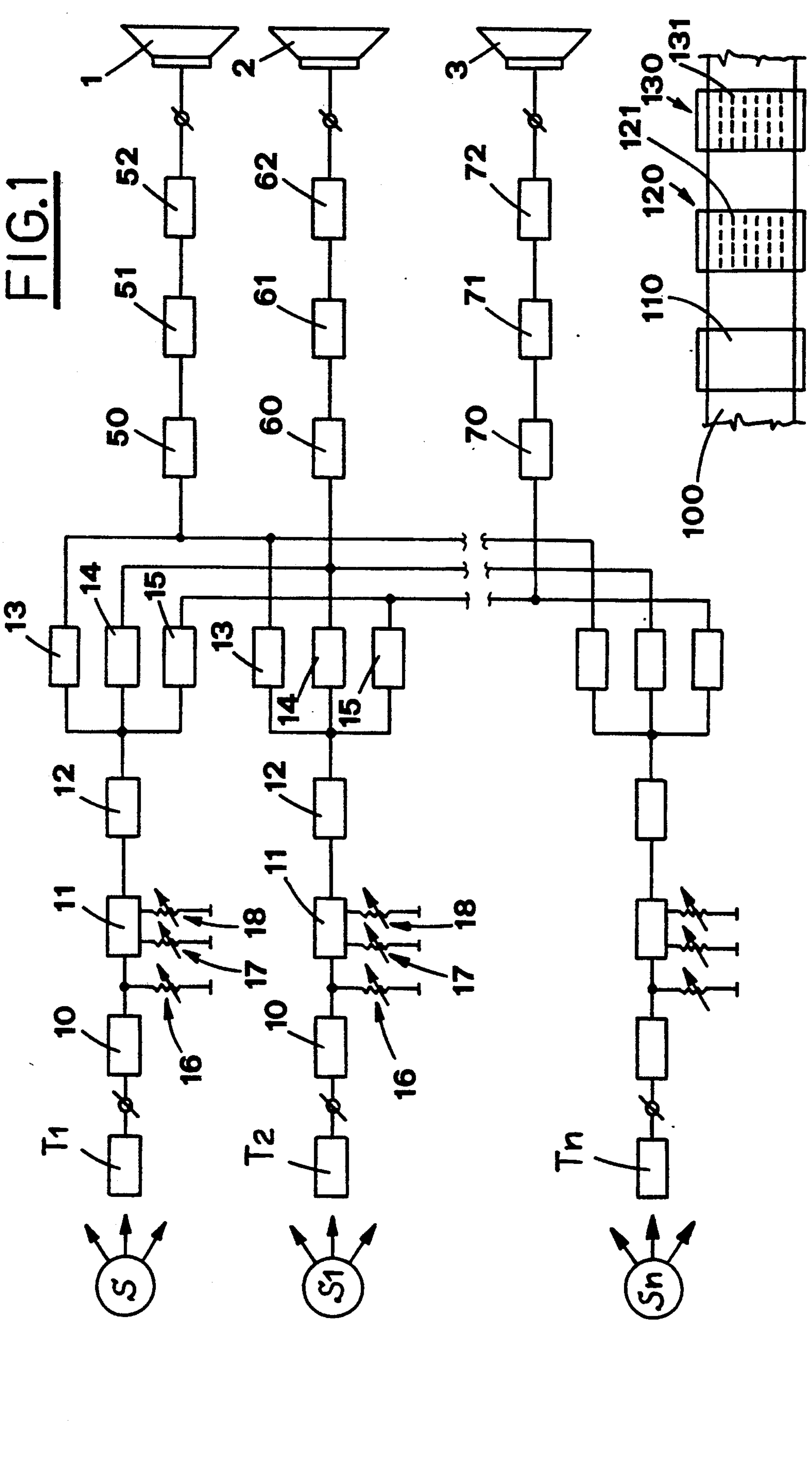
FIG. 1 shows a block diagram of the apparatus according to the invention, in a mono version.
FIG. 3 is a top view of a magnetic tape and of erasing, recording and playback heads.

With reference to FIG. 1, S, S1, Sn designate a certain number of sources of signals of various nature, e.g. acoustic signals, and T1, T2, Tn, designate an equal number of transducers (e.g. microphones, playback heads, etc.).

The transducers are connected to a respective inputs of the apparatus made according to the invention and in mono version.

For the sake of brevity only one of the circuits connected to the inputs will be described hereinafter, these circuits benig exactly identical to one another.

A preamplifier 10 is directly connected with the input and a tone regulating group 11, is connected to the output of the preamplifier 10.

The operation of the tone regulating group 11 is controlled by potentiometers 17, 18.

A potentiometer 16 is located upstream of the group 11 to control the volume of the signal coming out from the preamplifier.

A voltage follower 12 is connected with the output of the group 11, and has the function to isolate the upstream part, consisting of blocks 10 and 11, from the downstream part, (of the same block 12).

The downstream part of the block 12 consists of three band-separating active filters, 13, 14, 15, respectively a low-pass filter, (for frequencies from 20 Hz to 800 Hz, a band-pass filter (for frequencies from 800 Hz to 5000 Hz) and a high-pass filter (for frequencies from 5 KHz to 20 KHz).

All the blocks dealing with the same band of frequencies, have the respective outputs connected together to the same adding circuit; therefore, there are three adders 50, 60, 70, respectively for low, medium and high audio frequencies, to whose outputs respective line amplifiers 51, 61, 71, are connected.

Final power amplifiers 52, 62, 72, are connected to the outputs of the line amplifiers 51,61,71.

The outputs of these power amplifiers control loudspeakers 1, 2, 3, selected to reproduce, in the best way, the low (output by amplifier 52), medium (output by amplifier 62) and high frequencies (output by amplifier 72).

Figure 2:
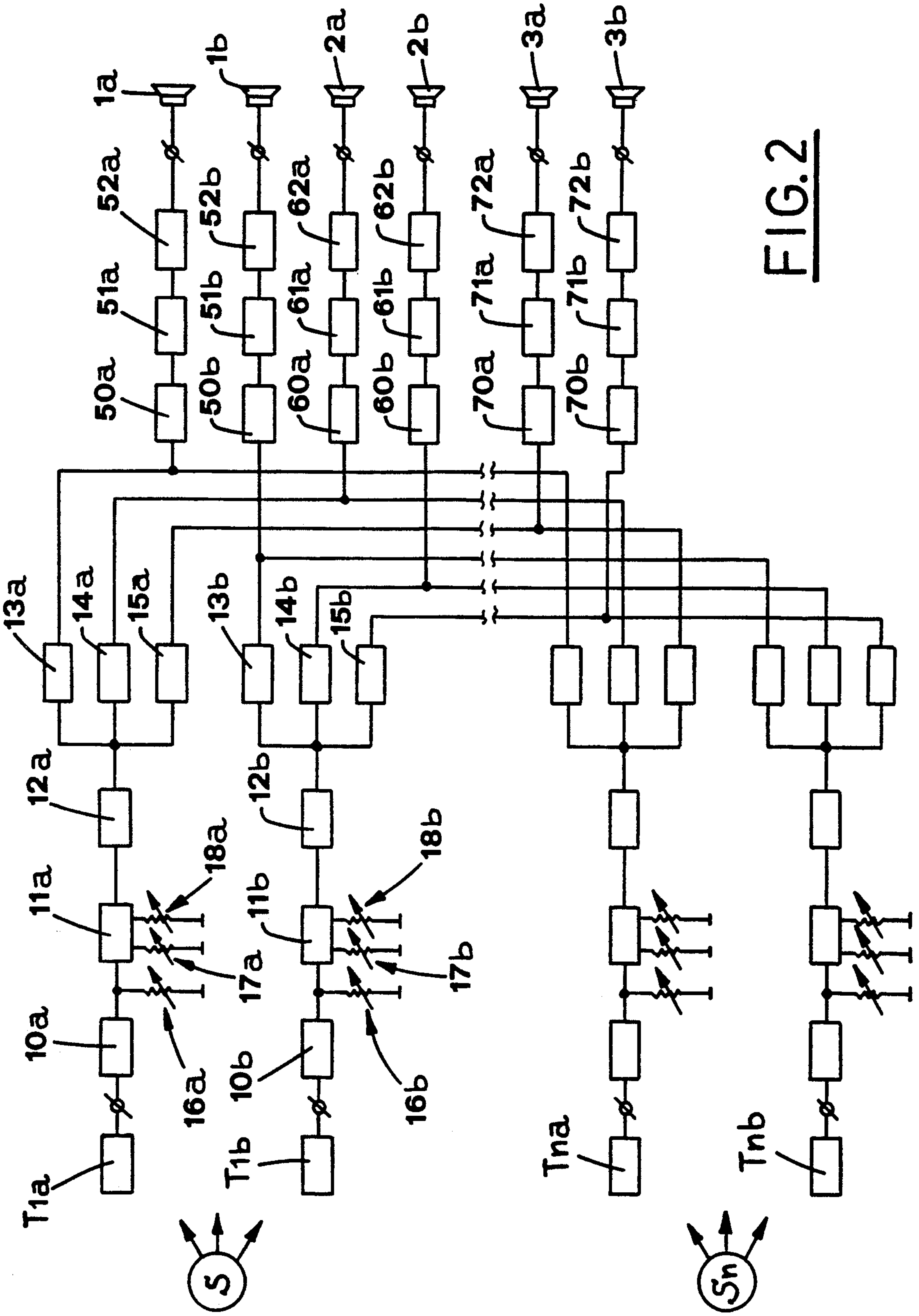
FIG. 2 shows a block diagram of the apparatus according to the invention, in the stereo version.

All what has been described above, with reference to the block diagram of FIG. 1, representing the apparatus according to the invention in mono version, is also valid for the stereo version, as shown in FIG. 2.

Still referring to a single input (all the others being identical), the only variation is the fact that every source of signal S is treated by two transducers, T1A and T1B, whose output electric signals are applied each to circuits functionally and structurally identical to those of the mono version described hereinbefore.

With respect to this latter, only the references of the various functional blocks have been modified, for which, with respect to those in FIG. 1, the letter A or B has been added to distinguish between mono version and stereo version and between the two channels making up each input of this latter version.

Obviously, in the stereo configuration the number of loudspeakers is doubled with respect to the previous case, thus to the outputs of each final power amplifier (52A, 62A, 72A for one channel and 52B, 62B, 72B for the other channel) are connected to loudspeakers, 1A, 2A, 3A for one channel and 1B, 2B, 3B for the other channel.

By the present invention, the typical drawbacks of systems known heretofore are avoided, consisting in the fact that these latter have a single mixing line for the mono version, or two lines for the stereo version, with a consequent too wide range of frequencies to be amplified, therefore subject to problems concerning the fidelity of signal reproduction.

With the apparatus provided by the present invention, on the other hand, are achieved advantages connected with the reduction of harmonic distortion, the elimination of phase displacements, a higher volume range of sound reproduction following more incisiveness and more power, all this being obtained without a marked control of tones; a better definition of timbre, and thus of sound quality.

In particular, the increased volume range of the apparatus can be obtained by varying the gain of the abovementioned line amplifiers and power amplifiers.

In case of saturation, this takes place only in the band concerned.

FIG. 3 shows one of the possible applications of the apparatus provided by the invention; numeral 100 designates a length of magnetic tape in the area where it crosses three heads 110, 120, 130, respectively for erasing, recording and playback, with the latter two provided, e.g. with six tracks, 121 for the recording head and 131 for the playback head. This latter head represents, with each of its tracks, the same number of transducers of FIGS. 1 and 2.

More precisely, for the mono apparatus the playback head mentioned above, with six tracks 131, can send electric signals to six different inputs of the same apparatus (one for each track 131); if stereophonic signals are recorded (thus requiring a stereo version of the apparatus) the electric signals sent by the head to the apparatus will engage six channels of this latter, corresponding to three sources of signals S independent from each other.

It is understood that the above has been described by way of example and it is not restrictive, therefore any other possible embodiment of technical-practical nature (e.g. the number of inputs) is to be considered as covered by the patent hereby applied for, as described above and as claimed hereinafter.

What is claimed is:

1. Sound mixer with band separation, having at least two input channels, each input channel including its own transducer for supplying electric signals corresponding to sounds coming from a separate sound source associated with a said transducer, said mixer comprising:

a group of the same number n (where n is a whole number equal to or greater than 2) of filters connected to the transducer of each input channel covering the audio spectrum range of the signals received by the transducer of the channel, each filter of each group having a selected and different bandpass characteristic;

n adders, each adder connected to and receiving only the output of the filter of each filter group having the same bandpass characteristic; and means for amplifying and reproducing the output signal of each adder.

2. A sound mixer as in claim 1 wherein said amplifying and reproducing means comprise amplifying means connected to said adder means and a loudspeaker connected to said amplifying means.

3. A sound mixer as in claim 1 further comprising a preamplifier and tone control means connected between each transducer and its connected filter group.

4. A sound mixer as in claim 3 further comprising a voltage follower connected between a said tone control means and its connected filter group.

5. Sound mixer with bank separation for stereo applications, having at least two input channels both concerned with the same sound source, each input channel including a transducer for supplying electric signals corresponding to sounds coming from said same sound source, said mixer comprising:

a group of the same number n (where n is a whole number equal to or greater than 2) of filters connected to the transducer of each input channel, each group covering the audio spectrum range of the signals supplied by its connected transducer and each filter of a respective group having a selected bandpass characteristic;

n adders, each adder connected to and receiving only the output of the filter of each group of filters having the same bandpass characteristic; and means for amplifying and reproducing the output signal of each adder.

6. A sound mixer as in claim 2 further comprising a preamplifier and tone control means connected between each transducer and its connected filter group.

7. A sound mixer as in claim 6 further comprising a voltage follower connected between a said tone control means and its connected filter group.

8. A sound mixer as in claim 2 when said amplifying and reproducing means comprise amplifying means connected to said adder means and a loudspeaker connected to said amplifying means.

* * * * *